Patented Feb. 24, 1925.

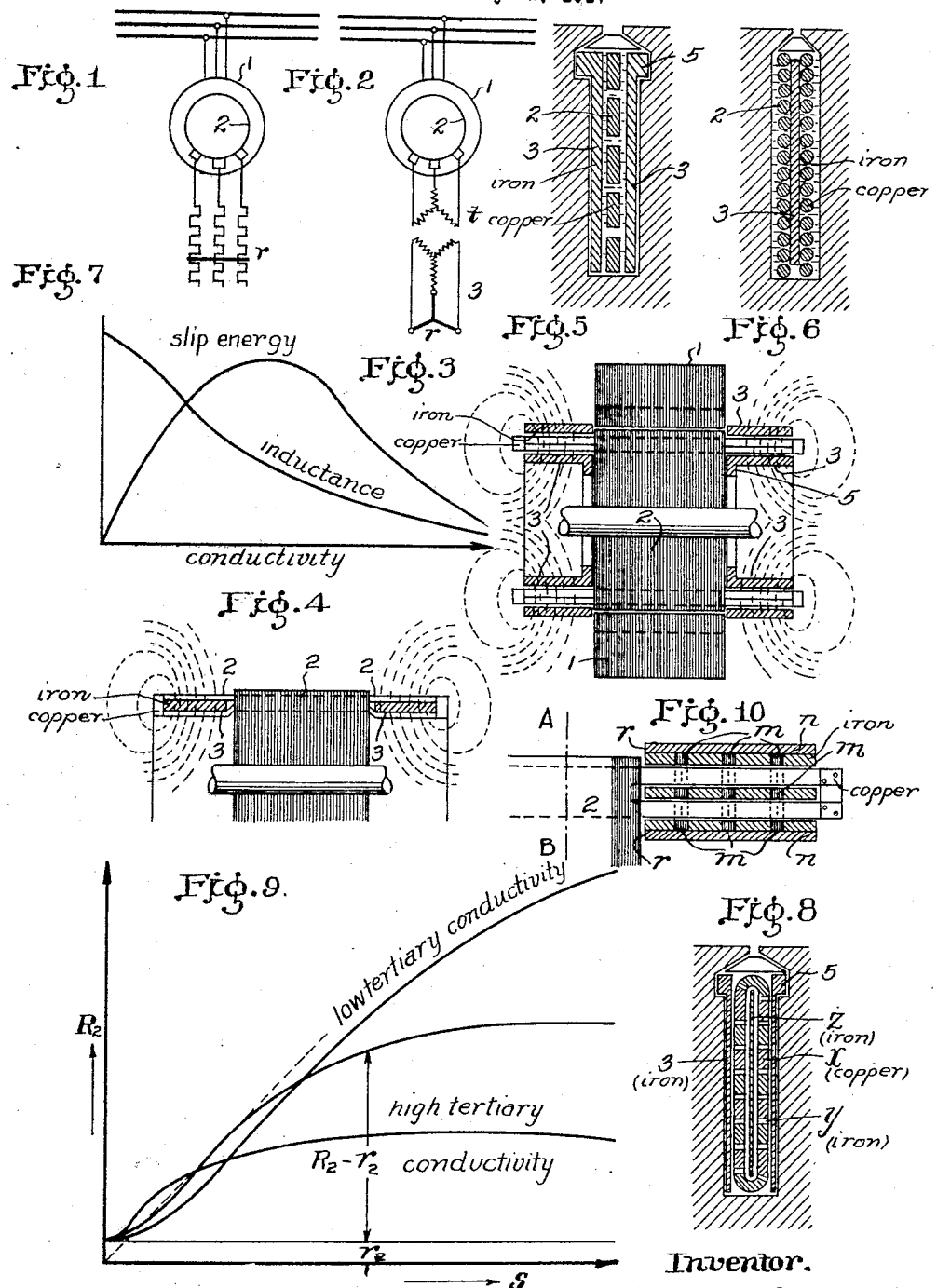

1,527,332

UNITED STATES PATENT OFFICE.

REINHOLD RÜDENBERG, OF CHARLOTTENBURG, NEAR BERLIN, GERMANY, ASSIGNOR TO SIEMENS-SCHUCKERTWERKE G. M. B. H., OF SIEMENSSTADT, NEAR BERLIN, GERMANY, A CORPORATION OF GERMANY.

INDUCTION MOTOR.

Application filed May 11, 1917. Serial No. 168,031.

*To all whom it may concern:*

Be it known that I, REINHOLD RÜDENBERG, a citizen of the German Empire, and resident of Charlottenburg, near Berlin, Germany, have invented certain new and useful Improvements in Induction Motors, of which the following is a full, clear, and concise specification.

My invention relates to asynchronous induction motors and the particular purpose of my improvement it to produce in the rotor an effective resistance loss by means of the leakage fields in the rotor, which loss rises as the slip increases, so as to obtain the full or nearly the full torque of the motor at speeds which differ considerably from synchronism.

My invention is illustrated in the accompanying drawings, in which —

Figure 1 shows diagrammatically a three-phase asynchronous motor having external resistance in the rotor;

Figure 2 shows diagrammatically a three-phase asynchronous motor whose rotor circuit induces current in a tertiary circuit, containing the controlling resistance;

Figure 3 shows a longitudinal section of an asynchronous phase-wound motor having a rotor winding without slip rings according to my invention;

Figure 4 shows a modification of the arrangement shown in Figure 3, only a portion of the rotor section being shown;

Figure 5 shows a modification of Figures 3 and 4, a transverse section of one slot only being illustrated, in which modification the tertiary circuit is formed by conductors disposed in the slot leakage field;

Figure 6 shows a modification of Figure 5, the secondary conductors being arranged in the slot laterally of the centrally disposed tertiary conductor;

Figure 7 shows the relation between the conductivity of the tertiary metal layers, disposed in the secondary field, and the inductance and the slip energy destroyed in the metal layers.

Figure 8 shows a transverse section on the line A, B, Figure 10 through a slot and its conductor arranged according to Figure 10.

Figure 9 is a curve diagram showing comparatively the losses caused by the tertiary and secondary currents in dependence upon the slip;

Figure 10 shows the end connections of a two-layer rotor winding, having iron rings interposed.

In general asynchronous induction motors are given as low a secondary resistance as possible for the reason that upon this resistance depend the energy losses in the rotor as well as the slip of the motor at increasing load, both of which should be kept as low as possible. It is well known however that motors of this kind will lose their torque as soon as the slip exceeds a certain value.

In particular these motors have only a very small starting torque when at rest and still smaller braking torque when they are reversed and compelled to run against the rotary field. In order to impart to the motors a high torque even in the case of large slip, a resistance of such magnitude must be thrown into the secondary circuit that the excess of energy transmitted to the motor over the energy mechanically taken off the shaft—the so-called slip energy—is annihilated. This is effected usually by inserting in the rotor circuit 2 shown in Fig. 1 of the drawings, starting or controlling resistance $r$ which are regulated according to the desired number of revolutions at which the maximum torque shall be obtained. For instance if it is desired to accelerate the motor from rest to full speed, this resistance must be regulated from a certain value, sufficing to consume the entire energy produced in the motor, gradually down to zero.

This regulation from outside can be dispensed with, if according to the diagram shown in Fig. 2 of the drawings the secondary circuit 2 of the asynchronous motor is inductively related to a tertiary circuit 3 in which the controlling resistance $r$ has been inserted. So long as the motor is at rest, the full frequency of the system prevails in the secondary circuit and therefore the resistance $r$ acts almost as if it were inserted in the secondary circuit conductively instead of inductively. It is therefore an easy matter to proportion it so that it furnishes the full starting torque. However near synchronism, that is to say, when the motor is running at full speed, the frequency of the secondary currents in the circuit 2 is so low that the electric coupling with the tertiary circuit disappears almost completely. The transformer effect of the tertiary circuit 3 is exceedingly small, especially for the reason that its ohmic resistance is very great as compared with the low inductive resistances caused by the low slip frequency. Therefore near synchronism the motor will work only with an effective rotor resistance almost equal to the conductive resistance of the secondary circuit itself.

With this inductive coupling of the regulating resistances of the asynchronous motor with the rotor circuit the effect may be obtained—without regulation from the outside—that the effective resistance in the secondary circuit of the motor is completely automatically varied from the high value at starting to the value of the inner resistance at synchronism. However this arrangement has a very serious disadvantage which tends to render it useful, in this form, only in a very limited number of cases. By inserting a transformer, especially one with closed magnetic circuit, between the secondary winding of the motor and the tertiary resistance, the reactance of the secondary circuit is increased to an extraordinary extent. So long as a considerable secondary frequency prevails and the secondary and tertiary circuits are coupled rather closely, this increase is not noticeable so much and the motor may still start with a high torque. However just near synchronism where the secondary frequency is very low, the reaction of the tertiary circuit upon the secondary circuit is reduced almost to nothing and consequently the field generated by the secondary circuit in the transformer $t$ is able to develop fully, thus increasing enormously the inductance and also increasing very strongly the apparent leakage of the whole asynchronous motor. Since, as is well known, the maximum torque of asynchronous motors is relatively only very small at a great leakage of the motor, it is easy to see that a motor arranged as shown in Fig. 2 will start very well but will develop only a very small torque within its working range.

This disadvantage is overcome according to the present invention by avoiding the use of an outer transformer having a closed iron field circuit and by using instead for the purpose of coupling the secondary and tertiary circuits, good conducting metal layers, disposed in the leakage field of the secondary currents, which layers are electrically independent of the rotor conductors and their end connections. In these metal layers the slip energy is destroyed by means of the tertiary currents induced by the secondary leakage field. Thus the metal layers constitute the conductors for the tertiary currents.

It is known in the art to arrange such metal layers in the leakage field of the end connections of armatures in electric machines. However, in the arrangements heretofore known the metal layers serve the purpose of reducing the inductance of the armature windings. Such reduction, however, is not concerned in the purpose of the present arrangement. The metal layers in the present case when disposed in the leakage field must be dimensioned from an entirely different viewpoint, namely, so that a slip energy is produced in them which is as large as possible. The curve diagram in Figure 7 plainly shows that the dimensioning of the metal layers in the secondary leakage field will vary according to the purpose to be attained by these metal layers. In this curve diagram the inductance and also the slip energy dissipated in the metal layers is plotted in relation to the conductivity of the metal layers.

The curves shown in Fig. 7 are based on the following formulæ:

$$R_2 = r_2 + r_3 \cdot \frac{(sm)^2}{r_3^2 + (sl_3)^2}$$

$$L_2 = l_2 - l_3 \cdot \frac{(sm)^2}{r_3^2 + (sl_3)^2}$$

In these equations, $r_2$ and $r_3$ represent the secondary and tertiary resistance respectively, $l_2$ and $l_3$ the coefficients respectively of the pertaining inductances, and $m$ represents the coefficient of the mutual inductance between the secondary and primary circuit.

The consideration of these formulae shows that the effective secondary resistance $R_2$ varies with the tertiary conductivity or with its reciprocal value, the tertiary resistance $r_3$. They further show that the inductance, or rather the self-inductance $L_2$ drops with increasing tertiary conductivity. From these conditions, it will be noted that the dimensioning of the metal layers in the secondary stray field will vary according to the one or other purpose, which is to be attained by the use of these metal layers.

While the inductance $L_2$ decreases gradually from a maximum value which it possesses at zero conductivity, as the conductivity increases, the slip energy increases from its zero value, which it has at zero conductivity, at first to a maximum value and then decreases again with increasing conductivity. Thus if metal layers are used for reducing the inductance, one would use a conductivity which is located at the right hand end of the curve shown in Figure 7, while according to the present invention, for the purpose of effectively consuming the slip energy, a conductivity would be used for the metal layers, which corresponds to the maximum of the slip energy. In Figures 3 to 6, 8 and 10, a number of forms are illustrated in which my invention may be reduced to practice.

Referring to Fig. 3, the rotor 2 of the asynchronous motor represented here is provided with a normal phase winding of the two layer drum winding type. The dotted lines represent the lines of force of the leakage field of the rotor end connections. Within this leakage field, at the inner and outer periphery of the row of end connections broad metallic rings 3 are arranged which have great width transversely to the direction of the leakage lines of force. In these metallic bodies the leakage field induces strong tertiary currents which may be increased to an extent by suitably proportioning the width and thickness of these rings as well as by properly selecting the conductivity of the material so that the best possible effect for suppressing the slip energy is obtained. In order to obtain a good inductive coupling of the tertiary circuits with the secondary circuits and at the same time to effect the generation of the strongest possible tertiary currents and consequently the realization of considerable losses of energy, I prefer, as shown in the drawings, to let the tertiary currents flow in broad metallic paths in the form of eddy currents. Of course these metallic paths may be combined with other necessary parts of the motor. Thus for instance the inner metal ring shown in Fig. 3 may at the same time be used as a support for the outside portion of the winding, while the outer metal ring may be employed with advantage as an end cover or bandage protecting the rotor winding against the action of the centrifugal force.

Another modification showing a still better inductive coupling of the tertiary and secondary circuits is represented diagrammatically in Fig. 4. The metallic ring 3 carrying eddy currents is here arranged between the two layers of the rotor winding 2, thus being of necessity traversed by all the end leakage lines of force of the secondary winding, in contradistinction to the modification shown in Fig. 3 where some of these lines of force might close in the space between the two tertiary circuits. Of course, according to requirements, the arrangements shown in Figs. 3 and 4 may be combined and in cases where smaller tertiary metallic masses are required, either the inner or the outer ring shown in Fig. 3 may be employed alone. Since the eddy currents flowing in the tertiary metal rings tend to follow the course of the currents in the end connections of the secondary circuit, it may be preferable in certain cases to reinforce the conductivity of the metallic layers on the side directed towards the iron, for instance by aid of collars 5 as shown in Fig. 3 in order to present a convenient end path to the eddy currents.

The example here described shows that it is not necessary for the appropriate arrangement of a tertiary circuit having the correct resistance, to conduct the rotor currents to the outside and that therefore such motors may be constructed without any slip rings, this feature presenting a further great simplification both from a constructional and economical point of view, and furthermore a material improvement in the reliability of operation. Now it is possible to go even one step further and to dispense with the phase wound rotor shown in Figs. 3 and 4, by replacing it by a squirrel-cage rotor, the most reliable and simplest type as far as construction and economy are concerned. The end leakage field of a rotor of this type being very small I prefer arrangements causing the slot leakage field to act upon the tertiary circuit. Fig. 5 of the drawings shows a modification comprising metal plates 3 of suitable dimensions arranged within the leakage field of a slot, the lines of force being represented by dotted lines. As the slot leakage field passes for the greater part through the teeth iron of the rotor and has to overcome merely the relatively short air gap formed by the width of the slot, the inductive coupling between tertiary and secondary circuits is a very perfect one also in this case, so that by suitably proportioning the metal bodies carrying the tertiary currents very superior effects can be obtained. Fig. 5 shows again the collars 5 on one side of the tertiary circuit conductors 3 presenting the best possible return path for the eddy currents. The distribution of these currents naturally tends also in this case to follow the path of the secondary currents in the slot, and they thus flow on the major portion of the width of the plate or layer in the same direction, so that they should be preferably given a suitable return path.

In order to prevent the slot leakage field, generated by the secondary currents, from being weakened by current displacement within the secondary conductors themselves, I prefer using, in the construction of the rotor, the well known twisted conductors or cables instead of solid conductors. Fig. 6 shows a type of conductor especially useful for this purpose, the strands 2 of the cable 2, forming the secondary slot bar, being twisted around the tertiary conductor 3 forming the core, whereby an extraordinarily good magnetic coupling of the secondary and tertiary conductors is obtained.

Aside from the end and slot leakage field, all other occurring secondary leakage fields may be used for the generation of tertiary currents according to the present invention, such as for instance the twice-interlinked leakage fields. As a matter of course some or all of these leakage fields may be employed in combination.

Aside from the favorable effect, by which the currents in the tertiary conductor destroy the slip energy, another advantage exists, such as prevails with the use of the well known metal layers in the end leakage field, namely, that the leakage field is considerably weakened at large rotor slips. Thus the maximum torque is further increased exactly within those ranges of speed, in which the control is desired. In the modifications shown in Figs. 3, 4 and 10 the rotor and leakage field is diminished to a considerable extent, while in the modifications shown in Figs. 5, and 6 the slot leakage field is greatly diminished. In practice squirrel-cage rotors constructed in accordance with the directions given do not show any rotor leakage worth speaking of.

The extent of the effect of the tertiary currents upon the controlling torque of the motor is of course very largely dependent upon the dimensions of the tertiary conductors. In case very thin conductors or conductors consisting of a material of low conductivity are employed, no strong tertiary currents are generated and therefore no appreciable slip energy can be consumed with their aid. Also even if the paths for the tertiary currents are made very large and if material having an extraordinarily good conductivity is employed, it may easily happen that the desired end is not attained. In such a case, it is true, rather strong tertiary currents will be generated, but they will destroy the secondary leakage field before they are able to cause any appreciable losses of energy in the highly conductive material of which they are composed.

Fig. 9 shows the additional losses $R_2 - r_2$ caused by the tertiary eddy currents within their conductors in dependence upon the slip S of the asynchronous motor as compared with the own losses $r_2$ of the secondary winding. As can be seen, the losses rise quickly at first with increasing slips, if all the tertiary current paths are highly conductive, but very soon they will approach a rather low maximum value which is not exceeded even at great slips. On the other hand, if the tertiary current paths have a low conductivity, a very considerable loss of energy might occur at great slip. But at small slips this loss arises so slowly that even at a considerable slip the motor will still be capable of exerting its original torque. Favorable effects resulting at least in an approximately proportional increase of the losses with the increase of slip within a greater range can be obtained only with a certain predetermined total conductivity of the tertiary current paths, as shown for example by the middle curve of Fig. 9. The straight dotted line in this figure represents that change of the effective rotor resistance or of the total losses which would be desirable for obtaining a maximum torque which remains the same at all slips. However, in order to obtain these most favorable conditions for each motor, an extremely careful preliminary calculation of the energy losses of the tertiary currents and of their reaction upon the secondary leakage fields is indispensable. To this end the ohmic resistance of the tertiary current paths must be made about as great as their inductive resistance at the slip range within which the motor is controlled.

In order to obtain favorable conditions of working it may prove useful to reinforce the seconadry leakage fields in some places by inserting iron layers, thus making it easier to predetermine a certain course and a certain intensity of the tertiary currents. Means to bring about this condition are shown for instance in Fig. 10, where iron conducting layers for the end leakage lines are provided. Here iron rings $m$ are concentrically arranged at certain points at the inner and outer periphery of the winding ends, and also between the ends of the two-layer winding. The leakage lines in the air between these rings are free to close upon themselves from the outer and inner rings $n$ to the adjoining poles and in this way very completely encircle the tertiary conducting layers $r$. There is no difficulty in proportioning an arrangement of this kind in such a manner that under the action of known secondary currents within the bars a leakage field of a predetermined strength is formed, which through transformer action and reaction generates tertiary losses of energy also of predetermined value at all slips which may occur, without any regulation from outside.

The winding of the armature shown in Figure 10 is illustrated in Figure 8 in transverse section on the line A, B in Figure 10. Each individual slot conductor consists of a plurality of twisted individual conductors for the purpose of reducing the secondary current displacement. These individual conductors are slightly insulated from each other and each is composed of two superimposed coupled conductors $x$, separated from each other by an iron insertion $y$. The secondary currents flow uniformly in all individual conductors since these all have the same relative location in the slot. They produce considerable leakage fields in these iron insertions, which latter in turn induce tertiary currents which flow in the upper portions of all individual conductors in one direction and in the lower portions in the other direction. In order to provide a good closed circuit for the tertiary currents, it is preferred to solder the two copper halves of each individual conductor at the upper and lower edge of the entire composite slot conductor. This conductive connection of the two elements of each individual conductor may also be made throughout its whole length, and even the iron insertion may be used as conductor and metallically connected to the two elements of the individual conductor. In order to avoid the slot leakage field forming in the iron insertions only at the crossing point of two insertions which insertions, like the individual conductors, run in opposite slanting directions in the two opposite flat portions of the composite conductor (see Figure 8), it is preferred to provide an iron core $z$ in the center of the composite conductor as is shown in Figure 8. This core then uniformly conducts all leakage lines of force between the two flat halves of the composite conductor and develops at the same time on its own part, as a tertiary conductor, a certain small, although useful amount of eddy currents.

Similar to the manner shown in Figure 5, laterally of the slot conductor tertiary metal layers 3 with rims 5 are provided. In certain instances these tertiary insertions 3 may be dispensed with and the arrangement shown in Figure 10 may also be used in connection with differently formed slot conductors or other windings, for instance in connection with a two layer winding.

I claim:—

1. An asynchronous motor having slots in its rotor armature and secondary conductors mounted in said slots, metal layers forming tertiary conductors and being disposed in the secondary slot leakage field but being electrically independent of the conductors in said slots and adapted to neutralize the tertiary currents induced by the secondary leakage field, said layers being embedded as cores in the slot conductors.

2. An asynchronous motor having slots in its rotor armature and secondary conductors mounted in said slots, metal layers forming tertiary conductors and being disposed in the secondary slot leakage field, but being electrically independent of the conductors in said slots and adapted to neutralize the tertiary currents induced by the secondary leakage field, the thickness of said layers being increased in suitable places to increase the production of tertiary eddy currents.

3. An asynchronous motor having slots in its rotor armature and secondary conductors mounted in said slots, metal layers forming tertiary conductors and being disposed in the secondary slot leakage field, but being electrically independent of the conductors in said slots and adapted to neutralize the tertiary currents induced by the secondary leakage field, the thickness of said layers being increased in suitable places to increase the production of tertiary eddy currents, the secondary conductors being wound around the tertiary conductors as a core.

4. An asynchronous motor having secondary conductors and metal layers disposed in the leakage field produced by the secondary currents passing through said conductors, said layers being independent of said secondary conductors and being suitably dimensioned to permit tertiary currents to be induced in them by the secondary leakage field, of sufficient strength to dissipate the slip energy of the motor, the ohmic resistance of the tertiary circuit formed by said layers being substantially equal to its inductive resistance at the average speed range of the motor.

5. An asynchronous motor having secondary conductors and metal layers disposed in the leakage field produced by the secondary currents passing through said conductors, said layers being independent of said secondary conductors and being suitably dimensioned to permit tertiary currents to be induced in them by the secondary leakage field, of sufficient strength to dissipate the slip energy of the motor, and iron layers between said conductors, adapted to increase the secondary leakage field at suitable places.

6. An asynchronous motor having secondary conductors and metal layers disposed in the leakage field produced by the secondary currents passing through said conductors, said layers being independent of said secondary conductors, and being suitably dimensioned to permit tertiary currents to be induced in them by the secondary leakage field, of sufficient strength to dissipate the slip energy of the motor, and iron layers embedded in said tertiary current conductors.

REINHOLD RÜDENBERG.